United States Patent
Huang

(10) Patent No.: US 12,485,610 B2
(45) Date of Patent: Dec. 2, 2025

(54) 3D PRINTING DEVICE WITH EXTRUSION PORT HAVING VARIABLE SIZE AND CONTROL METHOD THEREFOR

(71) Applicant: SUZHOU MEAMAN MACHINES CO., LTD, Suzhou (CN)

(72) Inventor: Weidong Huang, Suzhou (CN)

(73) Assignee: SUZHOU MEAMAN MACHINES CO., LTD, Suzhou (CN)

( * ) Notice: Subject to any disclaimer, the term of this patent is extended or adjusted under 35 U.S.C. 154(b) by 181 days.

(21) Appl. No.: 18/192,026

(22) Filed: Mar. 29, 2023

(65) Prior Publication Data

US 2023/0234287 A1 Jul. 27, 2023

Related U.S. Application Data

(63) Continuation of application No. PCT/CN2020/120405, filed on Oct. 12, 2020.

(51) Int. Cl.
*B29C 64/209* (2017.01)
*B29C 64/343* (2017.01)
*B33Y 30/00* (2015.01)

(52) U.S. Cl.
CPC .......... *B29C 64/209* (2017.08); *B29C 64/343* (2017.08); *B33Y 30/00* (2014.12)

(58) Field of Classification Search
CPC ...... B29C 64/209; B29C 64/343; B33Y 30/00
See application file for complete search history.

(56) References Cited

U.S. PATENT DOCUMENTS

| 3,186,032 A * | 6/1965 | Harwood ................ B29C 48/09 425/155 |
| 5,989,466 A * | 11/1999 | Kato ....................... B29C 48/09 264/40.5 |
| 2005/0110185 A1 | 5/2005 | Cook et al. |

(Continued)

FOREIGN PATENT DOCUMENTS

| CN | 1726121 A | 1/2006 |
| CN | 102481787 A | 5/2012 |

(Continued)

OTHER PUBLICATIONS

International Search Report and Written Opinion issued in corresponding PCT Application No. PCT/CN2020/120405, dated Jul. 8, 2021.

*Primary Examiner* — Nahida Sultana
(74) *Attorney, Agent, or Firm* — Westbridge IP LLC

(57) ABSTRACT

Disclosed are a 3D printing device with an extrusion port having a variable size and a control method thereof. The 3D printing device includes: a feeding portion with an inlet and an outlet for a material; a discharging portion with an extrusion port, where the extrusion port is capable of being in fluid communication with the outlet of the feeding portion to extrude the material, and the extrusion port is partitioned into a plurality of hole channels; and a control portion, configured to control, in a process of filling a single-communication region by utilizing the extrusion port, a relative movement between the feeding portion and the discharging portion, to change a quantity of hole channels in communication with the outlet of the feeding portion in the plurality of hole channels, thereby changing a size of the extrusion port.

9 Claims, 9 Drawing Sheets

(56) References Cited

U.S. PATENT DOCUMENTS

| | | | |
|---|---|---|---|
| 2006/0022377 A1* | 2/2006 | O'Connell | B29C 48/08 |
| | | | 264/209.8 |
| 2017/0157843 A1 | 6/2017 | Nystrom et al. | |
| 2017/0182701 A1 | 6/2017 | Ryan et al. | |
| 2018/0339448 A1 | 11/2018 | Fan et al. | |
| 2019/0315035 A1* | 10/2019 | Iuliano | B29C 48/313 |
| 2020/0023579 A1 | 1/2020 | Lynn et al. | |
| 2022/0234108 A1* | 7/2022 | Antesberger | B29C 48/345 |
| 2023/0030198 A1* | 2/2023 | Parrott | B33Y 10/00 |

FOREIGN PATENT DOCUMENTS

| | | | | |
|---|---|---|---|---|
| CN | 106945264 A | * | 7/2017 | B33Y 10/00 |
| CN | 107379519 A | | 11/2017 | |
| CN | 207972299 U | | 10/2018 | |
| CN | 108943703 A | | 12/2018 | |
| CN | 109247014 A | | 1/2019 | |
| CN | 110091503 A | | 8/2019 | |
| CN | 110696368 A | | 1/2020 | |
| CN | 110757785 A | | 2/2020 | |
| CN | 110891795 A | | 3/2020 | |
| CN | 111386187 A | | 7/2020 | |
| CN | 215849702 U | | 2/2022 | |
| DE | 102016009631 A1 | | 2/2018 | |
| DE | 102016012388 A1 | | 4/2018 | |
| DE | 202018101538 U1 | | 4/2018 | |
| EP | 1112786 A2 | * | 7/2001 | B21C 25/08 |
| JP | H05131468 A | | 5/1993 | |
| WO | 2016195620 A1 | | 12/2016 | |
| WO | 2018205149 A1 | | 11/2018 | |
| WO | 2020087359 A1 | | 5/2020 | |

* cited by examiner (a)

(b)

(c)

3D PRINTING DEVICE WITH EXTRUSION PORT HAVING VARIABLE SIZE AND CONTROL METHOD THEREFOR

CROSS-REFERENCE TO RELATED APPLICATIONS

This application is a continuation of International Application No. PCT/CN2020/120405, filed on Oct. 12, 2020, the disclosures of which are hereby incorporated by reference in its entirety.

TECHNICAL FIELD

The present application relates to the field of three-dimensional (3D) printing, and in particular, to a 3D printing device with an extrusion port having a variable size and a control method therefor.

BACKGROUND

A diameter of an extrusion port for a traditional 3D printing device is generally fixed.

With development of 3D printing technologies, a novel extrusion port has gradually emerged. A size of such extrusion port can be adjusted dynamically according to an actual need. A 3D printing device with such extrusion port has obvious advantages in taking both printing accuracy and printing efficiency into account.

However, there is still room for further improvement of the 3D printing device.

SUMMARY

According to a first aspect, a 3D printing device with an extrusion port having a variable size is provided, including: a feeding portion having an inlet and an outlet for a material; a discharging portion having an extrusion port, where the extrusion port is capable of being in fluid communication with the outlet of the feeding portion, so as to extrude the material, and the extrusion port is partitioned into a plurality of hole channels; and a control portion, configured to control, in a process of filling a single-communication region by utilizing the extrusion port, the feeding portion and the discharging portion to move relative to each other, so as to change a quantity of hole channels in communication with the outlet of the feeding portion in the plurality of hole channels, thereby changing a size of the extrusion port.

According to a second aspect, a 3D printing device is provided, including: a row of hole channels, and a control portion, configured to control the row of hole channels to make a row of materials be extruded simultaneously, so as to fill a region, and control opening and closing of the row of hole channels, to change a length of the row of materials, where an arrangement of the row of hole channels makes materials extruded from adjacent hole channels in the row of hole channels be capable of mutually fused in the region.

According to a third aspect, a control method for a 3D printing device with an extrusion port having a variable size is provided. The 3D printing device includes: a feeding portion having an inlet and an outlet for a material; and a discharging portion having an extrusion port, where the extrusion port is capable of being in fluid communication with the outlet of the feeding portion, so as to extrude the material, and the extrusion port is partitioned into a plurality of hole channels. The control method includes: controlling the extrusion port to fill a single-communication region; and controlling, in a process of filling the single-communication region by utilizing the extrusion port, the feeding portion and the discharging portion to move relative to each other, so as to change a quantity of hole channels in communication with the outlet of the feeding portion in the plurality of hole channels, thereby changing a size of the extrusion port.

According to a fourth aspect, a control method for a 3D printing device is provided. The 3D printing device includes a row of hole channels. The control method includes: controlling the row of hole channels to make a row of materials be extruded simultaneously, so as to fill a region, and controlling opening and closing of the row of hole channels, to change a length of the row of materials, where an arrangement of the row of hole channels makes materials extruded from adjacent hole channels in the row of hole channels be capable of mutually fused in the region.

DETAILED DESCRIPTION OF THE EMBODIMENTS

A diameter of an extrusion port for a traditional 3D printing device is generally fixed. With development of 3D printing technologies, a novel extrusion port has gradually emerged. A size of such extrusion port can be adjusted dynamically according to an actual need. A 3D printing device with such extrusion port has obvious advantages in taking both printing accuracy and printing efficiency into account.

In order to form an extrusion port with different sizes, generally, two movable blocks are disposed at the bottom of a 3D printing device in the related art (a gap between the two movable blocks is an extrusion port). In the related art, the two movable blocks are controlled to slide relative to each other, so that the gap between the two movable blocks is changed, thereby forming an extrusion port with different sizes. For the detailed description of the related art, reference may be made to, for example, PCT/CN2017/083647 and PCT/CN2018/113069.

However, in the foregoing solution, a material is squeezed at the extrusion port while the size of the extrusion port is changed, resulting in non-uniform material flow rates of the material, thus reducing printing quality. For example, when it is desired to reduce a length of the extrusion port, the two movable blocks are moved toward each other along a length direction of the extrusion port. Such movement of the two movable blocks squeezes the material in the length direction of the extrusion port. As a result, a pressure is spread in the length direction of the extrusion port, causing the non-uniform material flow rates of the material in the length direction of the extrusion port.

Embodiment 1

Figure 1:
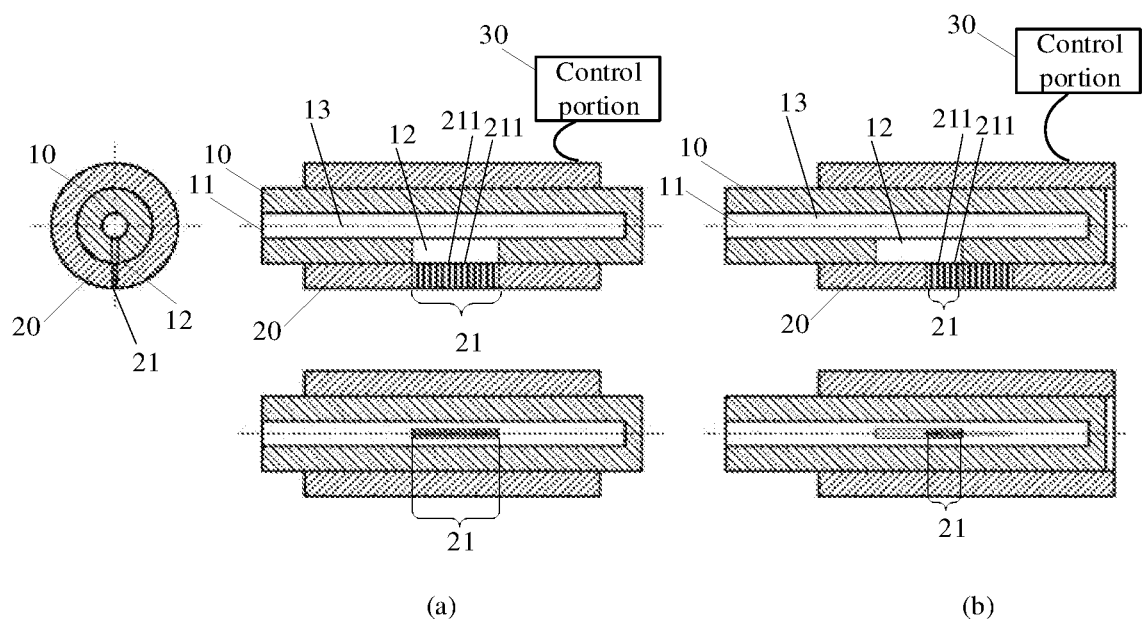
FIG. 1 shows schematic structural diagrams of a 3D printing device according to Embodiment 1 of the present application.

To resolve the foregoing problems, as shown in FIG. 1, a 3D printing device is provided in the present application. The 3D printing device may perform 3D printing by utilizing a flowable material (or a material in a molten state). A size of an extrusion port of the 3D printing device is variable.

The 3D printing device may include a feeding portion 10 and a discharging portion 20. A material in the 3D printing device may be conveyed to the discharging portion 20 through the feeding portion 10, and then extruded by the discharging portion 20.

The feeding portion 10 may include an inlet 11 and an outlet 12 for a material. A feeding channel 13 may be disposed between the inlet 11 and the outlet 12. The material may enter from the inlet 11, pass through the feeding channel 13, and flow out from the outlet 12. The outlet 12 for the material may be a slot, and a cross-sectional shape of the slot is not specifically limited in the embodiments of the present application. For example, the slot may be in a shape of a narrow and long rectangle, a trapezoid, or another shape.

The discharging portion 20 has an extrusion port 21. The extrusion port 21 is capable of being communicated with a fluid in the outlet 12 of the feeding portion 10, so as to extrude the material. For example, the extrusion port 21 may be disposed at an outer side of the outlet 12.

The extrusion port 21 may be configured to fill a region. The region may be a single-communication region. The extrusion port 21 may be used to fill the single-communication region in a surface filling manner, that is, in the process of filling the single-communication region, a length of the extrusion port 21 may change with a contour line of the single-communication region, so that the single-communication region is completely filled at a time.

The extrusion port 21 has a plurality of hole channels 211, or may be partitioned into a plurality of hole channels 211 (each hole channel may be a square hole or a circular hole). For example, the extrusion port 21 may be partitioned into a hole channel array with at least one row of hole channels. The hole channels 211 may be separated from each other by a hole wall (or a partition). The plurality of hole channels 211 may be closely arranged to make materials extruded from adjacent hole channels be capable of mutually fused (or connected to each other) in a region to be filled. Alternatively, in other words, an arrangement of the plurality of hole channels 211 makes the materials extruded from the adjacent hole channels in the plurality of hole channels 211 be capable of mutually fused on a printing platform (or referred to as a building platform). For example, when the printing platform is coated with the material extruded from each of the plurality of hole channels 211, since the materials extruded from the adjacent hole channels are close to each other, a mutually-connected coating (or a printing layer) may be formed by the flowing materials under their own weights. Certainly, in some embodiments, some auxiliary means (such as a mechanical rolling way) may further be used to ensure a fusion effect of the materials extruded from the plurality of hole channels 211.

It should be noted that, in the embodiments of the present application, a wall thickness of each of the plurality of hole channels 211, a distance between every two hole channels, or closeness of the arrangement of the hole channels are not specifically limited, which may be set according to material texture and fluidity.

Thicknesses of printing layers formed by the hole channels with different diameters are different. For example, for precision printing, a hole channel with a diameter of 0.1 mm or below may be used to form an ultra-thin printing layer with a printing thickness of less than 0.1 mm. For another example, for high-efficiency printing, a hole channel with a diameter of 1 mm or above may be used to form an extra-thick printing layer with a printing thickness of more than 1 mm.

As shown in FIG. 1, the 3D printing device may further include a control portion 30. The control portion 30 may be used to control, in a process of filling a single-communication region by utilizing the extrusion port 21, the feeding portion 10 and the discharging portion 20 to move relative to each other, so as to change a quantity of hole channels 211 in communication with the outlet 12 of the feeding portion 10 in the plurality of hole channels 211, thereby changing a size of the extrusion port 21.

Figure 2:
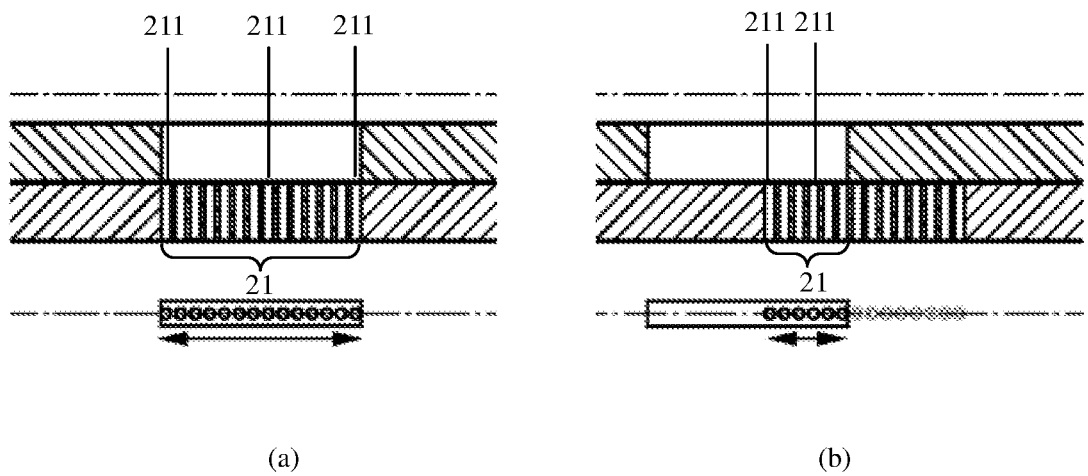
FIG. 2 shows partially enlarged views of the 3D printing device shown in FIG. 1.

In an example, as shown in FIG. 1 and FIG. 2, the feeding portion 10 is an inner cylinder, and the discharging portion 20 is a sleeve of the inner cylinder. The control portion 30 may be configured to control the inner cylinder and the sleeve to move along an axial direction of the inner cylinder, to change a length of the extrusion port 21. For example, when the inner cylinder and the sleeve are at the positions shown in part (a) in FIG. 1, where part (a) in FIG. 2 is a partial enlarged view of a region near the extrusion port 21 in a state shown in part (a) in FIG. 1, all the hole channels 211 in the extrusion port 21 are communicated with the outlet 12, and the extrusion port 21 has the longest length. When the control portion 30 controls the inner cylinder and the sleeve to slide along an axis of the inner cylinder to the positions shown in part (b) in FIG. 1, where part (b) in FIG. 2 is a partial enlarged view of a region near the extrusion port 21 in a state shown in part (b) in FIG. 1, some hole channels 211 in the extrusion port 21 are shielded, the materials fail to be extruded from these shielded hole channels, and thus the length of the extrusion port 21 is shortened.

Figure 3:
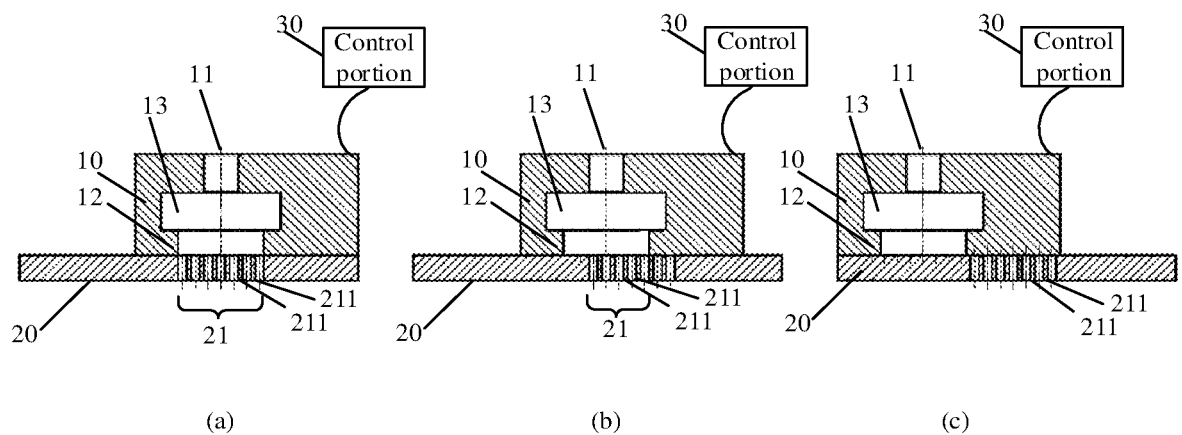
FIG. 3 shows schematic structural diagrams of another 3D printing device according to Embodiment 1 of the present application.

In another example, as shown in FIG. 3, the feeding portion 10 may be in a shape of a cube, a cylinder, or in any other shape. The discharging portion 20 may be a shielding plate located at an outer side of the outlet 12 of the feeding portion 10. The control portion 30 may be configured to control the feeding portion 10 and the shielding plate 20 to move relative to each other along a length direction of the extrusion port 21. For example, when the feeding portion 10 and the shielding plate 20 are at the positions shown in part (a) in FIG. 3, all the hole channels 211 in the extrusion port 21 are communicated with the outlet 12, and the extrusion port 21 has the longest length. When the control portion 30 controls the shielding plate to slide along a length direction of the extrusion port 21 to the position shown in part (b) in FIG. 3, some hole channels 211 in the extrusion port 21 are shielded, and the length of the extrusion port 21 is shortened.

The above two examples are exemplified by changing the length of the extrusion port 21. In some embodiments, a width of the extrusion port 21 may be changed by controlling a relative movement between the feeding portion 10 and the discharging portion 20.

Figure 4:
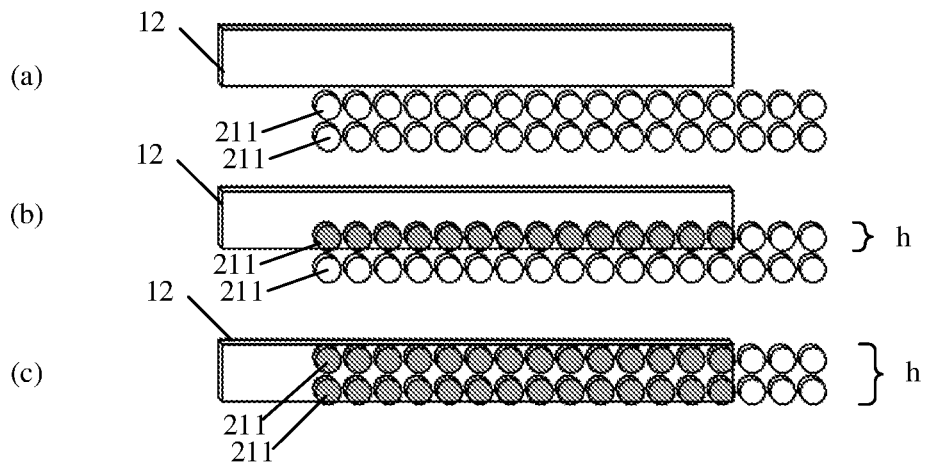
FIG. 4 is a schematic diagram of an arrangement of a plurality of rows of hole channels according to Embodiment 1 of the present application.

In an example, as shown in FIG. 4, a plurality of hole channels 211 may form a plurality of rows of hole channels (two rows of hole channels are shown in FIG. 4). The control portion 30 may control the feeding portion 10 and the discharging portion 20 to move relative to each other, so as to change a quantity of rows of hole channels in a communication state, thereby changing the width of the extrusion port 21. When the control portion 30 controls the feeding portion 10 and the discharging portion 20 to move relative to each other to make the outlet 12 of the feeding portion 10 and the plurality of rows of hole channels be at the positions shown in part (b) in FIG. 4, one row of hole channels in the plurality of rows of hole channels is in fluid communication with the outlet 12, and the width h of the extrusion port 21 is relatively small, which is equivalent to the diameter of one hole channel. When the control portion 30 controls the feeding portion 10 and the discharging portion 20 to move relative to each other to make the outlet 12 of the feeding portion 10 and the plurality of rows of hole channels be at the positions shown in part (c) in FIG. 4, the width h of the extrusion port 21 is increased, which is equivalent to a sum of the diameters of two hole channels.

In 3D printing, a single-layer printing thickness may be changed by changing the width of the extrusion port, so that the 3D printing device may implement different printing efficiency and printing accuracy. For example, when a printing accuracy requirement is relatively low, the single-layer printing thickness may be increased to improve the printing efficiency. When refined printing is required, the single-layer printing thickness may be reduced to improve the printing accuracy.

Figure 5:
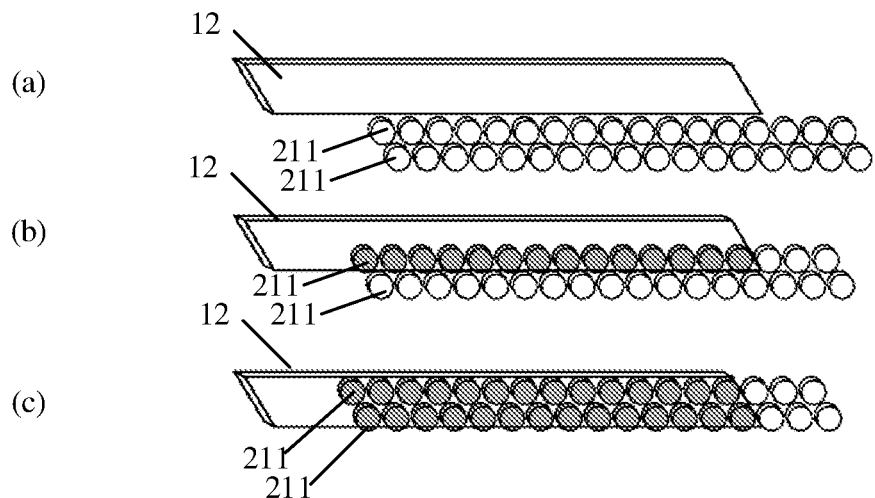
FIG. 5 is a schematic diagram of another arrangement of a plurality of rows of hole channels according to Embodiment 1 of the present application.

In the embodiments of the present application, an arrangement of the plurality of rows of hole channels is not specifically limited. In addition to a rectangular arrangement shown in FIG. 4, a staggered arrangement shown in FIG. 5 may be used and this arrangement is more compact. Compared with the arrangement shown in FIG. 4, a contour edge printed by using the plurality of rows of hole channels shown in FIG. 5 is different.

In a 3D printing process, a printing process often needs to be paused. For example, when printing reaches a contour edge of a section or region, the printing process needs to be paused, the 3D printing device is moved to a new printing starting position, and then printing continues. Since a material (such as a high molecular material) used in a 3D printing technology is usually viscoelastic, when conveying of the material is stopped, the material usually cannot stop flowing abruptly. In this case, the material is accumulated continuously outside a contour edge of a section or region to be printed, which destroys a contour shape of the printing section or region, reducing geometric accuracy of a printed piece.

In order to resolve the foregoing problems, in some embodiments, the control portion 30 may further be configured to make the plurality of hole channels 211 move out of a region where the outlet 12 of the feeding portion 10 is located (that is, making the plurality of hole channels 211 be misaligned with the outlet 12 to block the plurality of hole channels 211), so as to simultaneously close the plurality of hole channels 211 quickly.

For example, in the embodiment illustrated in FIG. 1, the outlet 12 of the feeding portion 10 may be designed as a slot with a very small width. When the control portion 30 controls the inner cylinder or the sleeve to rotate at a very small angle around the axis of the inner cylinder, the plurality of hole channels 211 may be allowed to leave the region where the outlet is located, so that an extrusion process of the material is stopped quickly.

For another example, in the embodiment illustrated in FIG. 3, when the control portion 30 controls the shielding plate to slide along the length direction of extrusion port 21 to the position shown in part (c) in FIG. 3, all the hole channels 211 in the extrusion port 21 are shielded, and the length of the extrusion port 21 becomes zero. In this case, the 3D printing device stops material extrusion.

If the plurality of hole channels 211 have a plurality of rows of hole channels shown in FIG. 4, the control portion 30 may control the feeding portion 10 and the discharging portion 20 to move to the positions shown in part (a) in FIG. 4. In this way, the outlet 12 is completely staggered with the plurality of rows of hole channels, and the size of the extrusion port is zero, thus the 3D printing device stops material extrusion.

In the above solution of controlling the 3D printing device to stop material discharging, the designed solution of the inner cylinder combined with the sleeve is simple to control, which is more helpful for the 3D printing device to quickly respond to a printing stop command from a control system, so as to prevent the material from continuing to flow out after the system sends the printing stop command.

It should be noted that, in a process of changing the width of the extrusion port 21, the control portion 30 may control the feeding portion 10 and the discharging portion 20 to move relative to each other, or control the feeding portion 10 and the discharging portion 20 to rotate relative to each other, which is related to a structure of the feeding portion 10 and the discharging portion 20. This is not limited in the embodiments of the present application. For example, assuming that the feeding portion 10 and the discharging portion 20 adopt the structure of the inner cylinder combined with the sleeve shown in FIG. 1, each row of hole channels in the plurality of rows hole channels may be arranged along the axial direction of the inner cylinder, and different rows of hole channels are distributed in a circumferential direction of the inner cylinder. In this case, the control portion 30 may control the inner cylinder and the sleeve to rotate relative to each other around the axis of the inner cylinder, so as to change a quantity of rows of hole channels in communication with the outlet 12, thereby changing the width of the extrusion port. For another example, assuming that the feeding portion 10 and the discharging portion 20 adopt the structure that a shielding plate 20 is disposed at the bottom of the feeding portion 10 shown in FIG. 3, the control portion 30 may control the shielding plate 20 to move along the width direction of the extrusion port 21, thereby changing the width of the extrusion port 21.

Since opening/closing control of the hole channels does not cause squeezing of a material in the length direction or width direction of the extrusion port, a problem of non-uniform material flow rates is avoided, so that printing quality may be improved.

It should be noted that, in some embodiments, length control and width control of the extrusion port 21 may be combined with each other, so that sizes of the extrusion port 21 in various dimensions may be changed flexibly according to an actual need.

Figure 6:
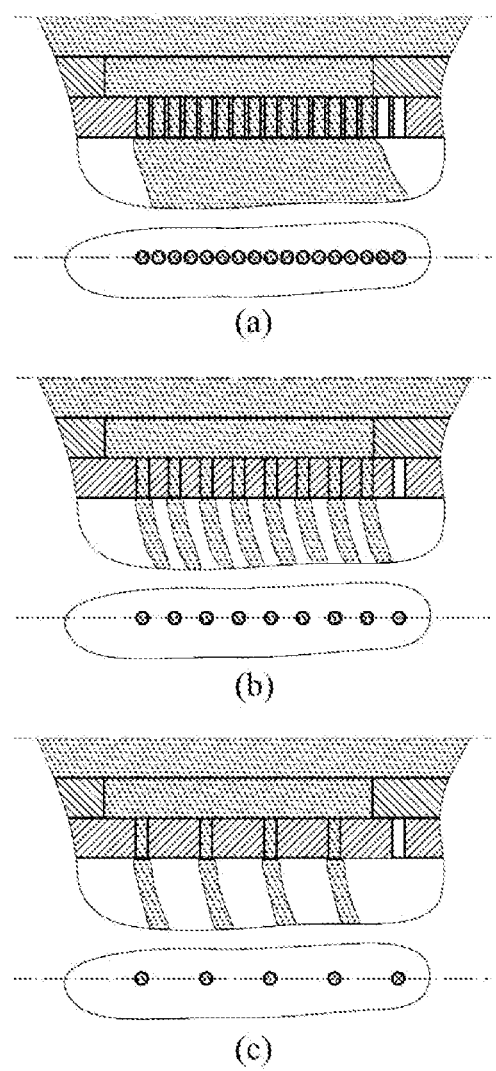
FIG. 6 shows schematic diagrams of a plurality of hole channel arrays with different spacing distances according to Embodiment 1 of the present application.
Figure 7:
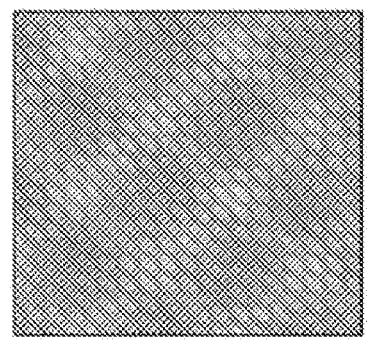
FIG. 7 shows example diagrams of a solid structure and grid structures printed by using the plurality of hole channel arrays shown in FIG. 6.
Figure 7:
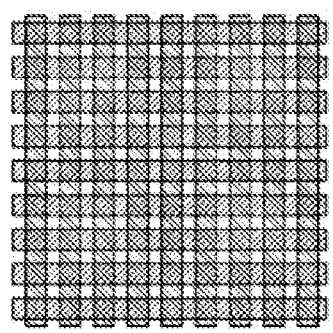
Figure 7:
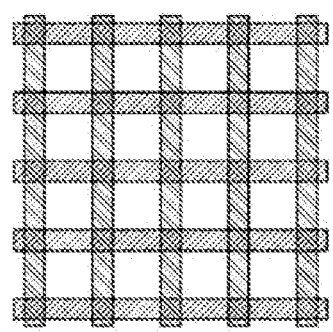

A first hole channel array formed by a plurality of hole channels 211 is more suitable for printing of a solid structure (part (a) in FIG. 6 shows an example of a first hole channel array, and a solid structure printed based on this array is shown in part (a) in FIG. 7. In order to be compatible with grid printing, in some embodiments, the 3D printing device may be configured with a second hole channel array shown in part (b) in FIG. 6 or part (c) in FIG. 6 on the basis of the first hole channel array. Compared with the first hole channel array, hole channels in the second hole channel array are arranged more sparse, making materials extruded from different hole channels in the second hole channel array be separated from each other on a printing platform. Therefore, each hole channel in the second hole channel array may be regarded as an independent extrusion port. Part (b) in FIG. 7 and part (c) in FIG. 7 are examples of grid structures printed by using the second hole channel arrays shown in part (b) in FIG. 6 and part (c) in FIG. 6, respectively.

Figure 8:
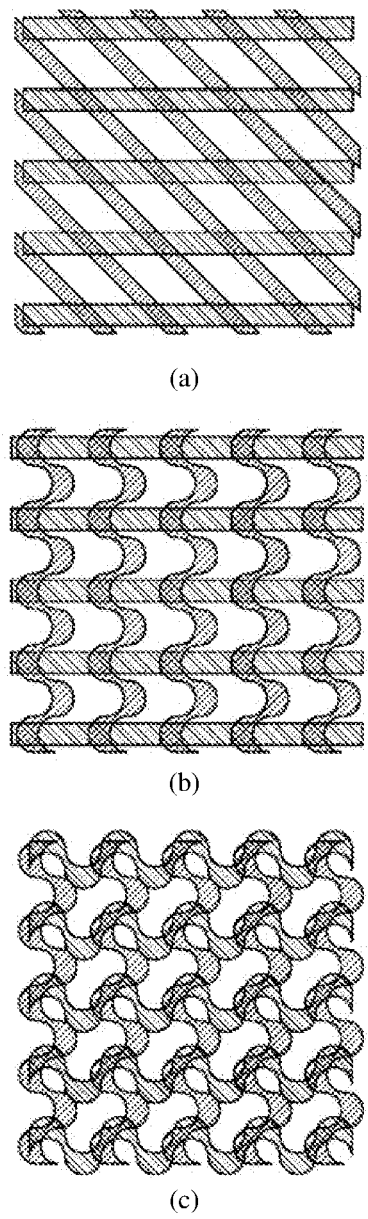
FIG. 8 shows example diagrams of grid structures printed by a 3D printing device according to Embodiment 1 of the present application.

Grid members that can be printed by the 3D printing device are not limited to the foregoing forms. For different appearance or structure requirements, the 3D printing device may be controlled to print out grid members with different shapes, which may be specifically implemented by changing a movement mode of the 3D printing device. For example, when printing different layers, the 3D printing device may be deflected by a specific angle. The deflection angle is not limited, and may be any value. For example, printing of the grid structure shown in part (b) in FIG. 7 or part (c) in FIG. 7 is implemented by deflecting a movement direction of the 3D printing device by 90 degrees during interlayer printing. For another example, printing of a grid structure shown in part (a) in FIG. 8 is realized by deflecting the movement direction of the 3D printing device by 45 degrees during the interlayer printing.

In addition, in some embodiments, different relative movement modes may be used between the 3D printing device and the printing platform. For example, when the structure shown in part (a) in FIG. 8 is printed, the relative movement mode between the 3D printing device and the printing platform is a linear movement mode. When the structure shown in part (b) in FIG. 8 is printed, the relative movement mode between the 3D printing device and the printing platform is a linear movement mode combined with a curved movement mode. When the structure shown in part (c) in FIG. 8 is printed, the relative movement mode between the 3D printing device and the printing platform is a pure curved movement mode. In the embodiments of the present application, there is no specific limitations on the relative movement modes between the 3D printing device and the printing platform, and different movement modes may be combined arbitrarily, so as to form grid members with various structures.

The control portion 30 may control the first hole channel array to be in fluid communication with the outlet 12 of the feeding portion 10, or control the second hole channel array to be in fluid communication with the outlet 12 of the feeding portion 10. In other words, the control portion 30 may select a hole channel array in fluid communication with the outlet 12 of the feeding portion 10 from the first hole channel array and the second hole channel array. For example, the solution of the inner cylinder combined with the sleeve illustrated in FIG. 1 is used as an example, the first hole channel array and the second hole channel array are located at different positions in the circumferential direction of the sleeve, respectively, and the control portion 30 may control the inner cylinder and the sleeve to rotate relative to each other, so as to make a choice between the first hole channel array and the second hole channel array.

It should also be noted that, there are many ways for the control portion 30 to control the relative movement of the feeding portion 10 and the discharging portion 20, For example, the feeding portion 10 may be kept stationary, and the discharging portion 20 is controlled to move; or the discharging portion 20 may be kept stationary, and the feeding portion 10 is controlled to move; or both are controlled to move simultaneously.

If it is desired to apply the 3D printing device to the surface building scene described in PCT/CN2017/083647 or PCT/CN2018/113069, in a printing process, the control portion 30 may control a length of the extrusion port 21 to change with a contour line of a region to be filled, so as to complete filling of the region at one time.

The 3D printing device provided in the present application may refer to a 3D printing head or a whole 3D printing system. The control portion of the 3D printing device may be implemented by software, hardware, or a combination thereof.

In the present application, printing, filling and coating are sometimes interchangeable. For example, printing a region may refer to coating the region or filling the region with a material.

Embodiment 2

Embodiment 2 mainly differs from Embodiment 1 in that a plurality of hole channels are disposed in an inner part of an outlet 12 of the feeding portion 10 in Embodiment 2, and the plurality of hole channels are referred to as an upper row of hole channels in Embodiment 2. The plurality of hole channels 211 in the discharging portion 20 in Embodiment 1 are referred to as a lower row of hole channels in Embodiment 2. In other words, a control portion 30 in Embodiment 2 implements adjustment of one or more of a length size and a width size of an extrusion port 21 mainly by controlling a relative position of the upper and lower rows of hole channels. Other structures in Embodiment 2 are similar to those in Embodiment 1. For example, a discharging portion 20 in Embodiment 2 may also adopt the sleeve structure shown in FIG. 1 or the shielding plate structure shown in FIG. 3. Therefore, for a structure not described in detail in Embodiment 2, reference may be made to Embodiment 1.

Figure 9:
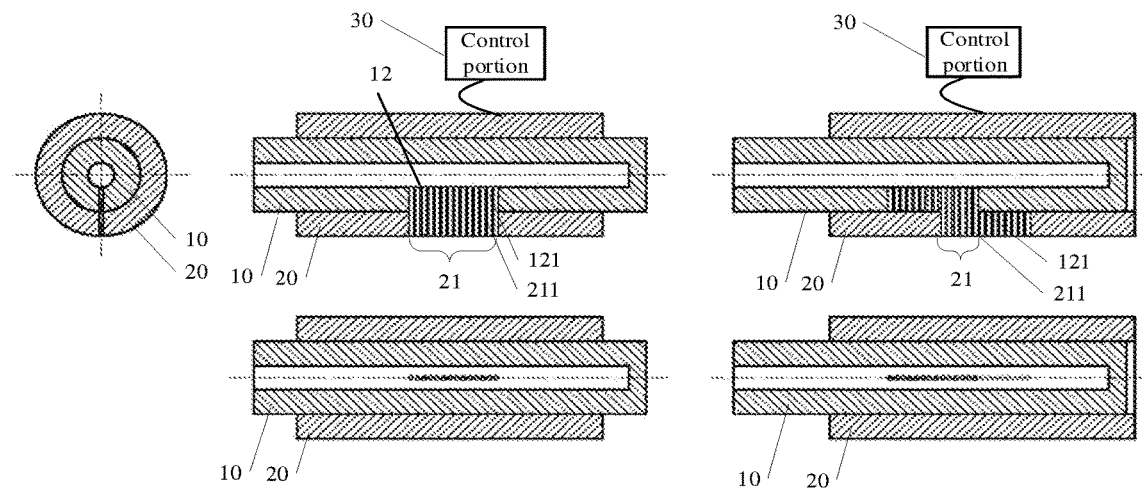
FIG. 9 shows schematic structural diagrams of a 3D printing device according to Embodiment 2 of the present application.
Figure 10:
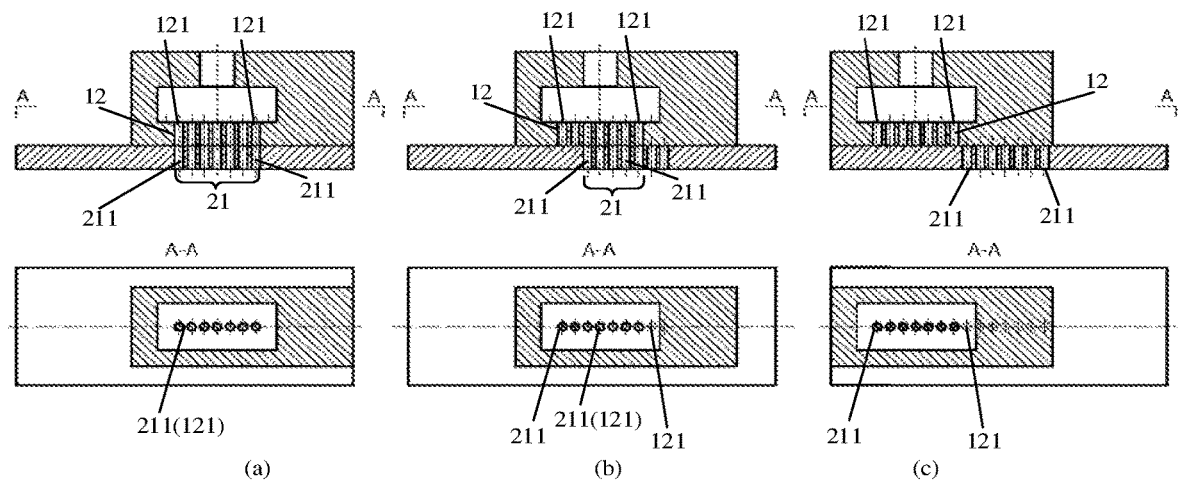
FIG. 10 shows schematic structural diagrams of another 3D printing device according to Embodiment 2 of the present application.

Referring to FIG. 9 and FIG. 10, the outlet 12 of the feeding portion 10 has or is partitioned into an upper row of hole channels 121, and a lower row of hole channels 211 is disposed in an inner part of the extrusion port 21. The diameters of the upper row of hole channels 121 and the lower row of hole channels 211 may be the same or have some difference. A row of materials (such as one row of filamentous materials) may be extruded from a row of hole channels in communication with the upper row of hole channels 121 in the lower row of hole channels 211.

The control portion 30 may control the upper row of hole channels 121 and the lower row of hole channels 211 to move relative to each other (such as slide relative to each other) along an arrangement direction (or an extension direction) of the upper row of hole channels 121 or the lower row of hole channels 211, to change a quantity of hole channels in communication with the upper row of hole channels 121 in the lower row of hole channels 211, so as to change a length of materials extruded from the lower row of hole channels 211.

In a 3D printing process, a printing process often needs to be paused. For example, when printing reaches a contour edge of a section or region, the printing process needs to be paused, the 3D printing device is moved to a new printing starting position, and then a subsequent printing process continues. Since a material (such as a high molecular material) used in a 3D printing technology is usually viscoelastic, when conveying of the material is stopped, the material usually cannot stop flowing abruptly. In this case, the material is accumulated continuously outside a contour edge of a section or region to be printed, which destroys a contour shape of the printing section or region, reducing geometric accuracy of a printed piece.

In order to resolve the foregoing problems, in some embodiments, the control portion 30 may control a relative movement between the upper row of hole channels 121 and the lower row of hole channels 211, to make the upper row of hole channels 121 and the lower row of hole channels 211 be misaligned with each other simultaneously, thus quickly closing the lower row of hole channels 211, so that extrusion of a material from the lower row of hole channels 211 stops simultaneously.

Figure 11:
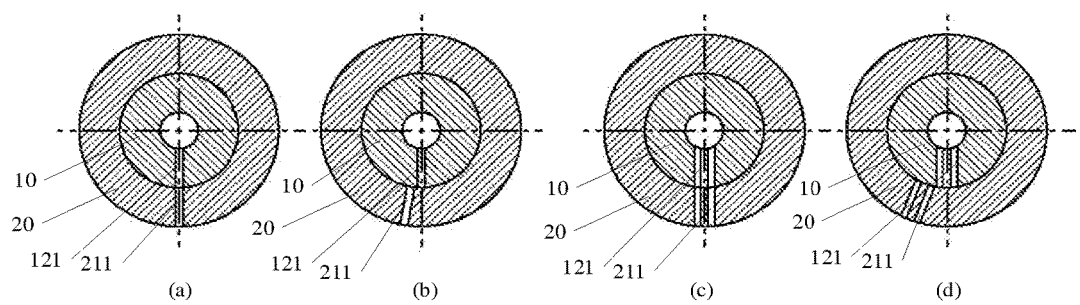
FIG. 11 shows side views of a 3D printing device with a structure in which a sleeve is combined with an inner cylinder according to Embodiment 2 of the present application.

For example, in the embodiment illustrated in FIG. 9, the control portion 30 may control an inner cylinder 10 or a sleeve 20 to rotate at a very small angle around an axis of the inner cylinder 10. In this case, an upper row of hole channels 121 and a lower row of hole channels 211 are misaligned with each other simultaneously, to stop a material extrusion process quickly. If the upper row of hole channels 121 and the lower row of hole channels 211 both include one row of hole channels, for a quick closing mode of the lower row of hole channels 211, reference may be made to a process shown in part (a) in FIG. 11 and part (b) in FIG. 11. If the upper row of hole channels 121 and the lower row of hole channels 211 both include a plurality of rows of hole channels, for a quick closing mode of the lower row of hole channels 211, reference may be made a process shown in part (c) in FIG. 11 and part (d) in FIG. 11. The designed solution of the inner cylinder combined with the sleeve is easy to control, which is more helpful for the 3D printing device to quickly respond to a printing stop command from the control portion, so as to prevent the material from continuing to flow out after the system sends the printing stop command.

In 3D printing, different printing efficiency and printing accuracy may be implemented by changing a single-layer printing thickness. For example, when a printing accuracy requirement is relatively low, the single-layer printing thickness may be increased to improve the printing efficiency. When refined printing is required, the single-layer printing thickness may be reduced to improve the printing accuracy.

Figure 12:
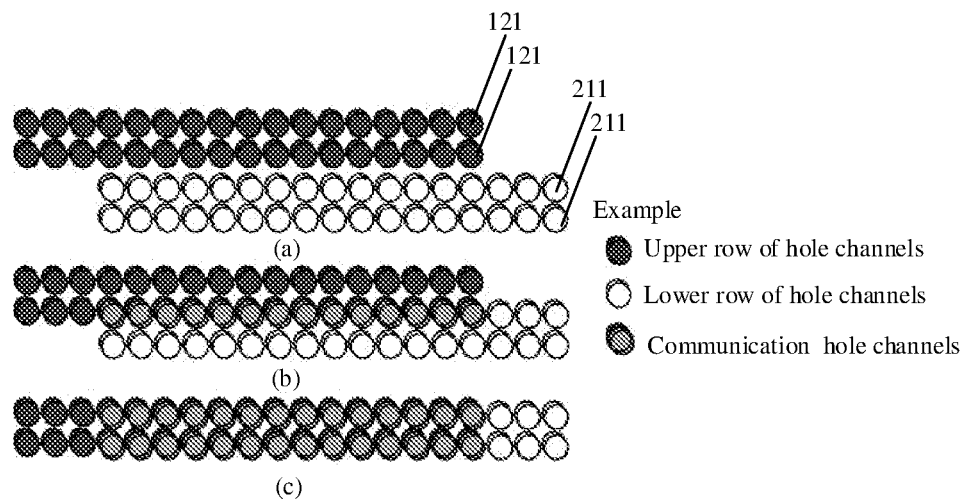
FIG. 12 and FIG. 13 are schematic diagrams of arrangements of a plurality of rows of hole channels according to Embodiment 2 of the present application.

In order to be capable of adjusting a printing thickness, the upper row of hole channels 121 and the lower row of hole channels 211 may both include a plurality of rows of hole channels. FIG. 12 is used as an example, the upper row of hole channels (indicated by black circles in FIG. 12) and the lower row of hole channels (indicated by white circles in FIG. 12) both include two rows of hole channels. In a state shown in part (a) in FIG. 12, all the upper row of hole channels 121 and the lower row of hole channels 211 have no overlapping hole channels, and all the hole channels are in a blocked state, so that materials cannot flow out. In a state shown in part (b) in FIG. 12, the upper row of hole channels 121 and the lower row of hole channels 211 have one row of overlapping hole channels, in this case, a single-layer printing thickness is a width of one row of hole channels. In the state shown in part (c) in FIG. 12, the upper row of hole channels 121 and the lower row of hole channels 211 have two rows of overlapping hole channels, In this case, the single-layer printing thickness is a width of the two rows of hole channels. The control portion 30 may control the upper row of hole channels 121 and the lower row of hole channels 211 to move along a width direction of the upper row of hole channels 121, so as to change a quantity of rows of hole channels, from which materials can be extruded, in the lower row of hole channels.

Figure 13:
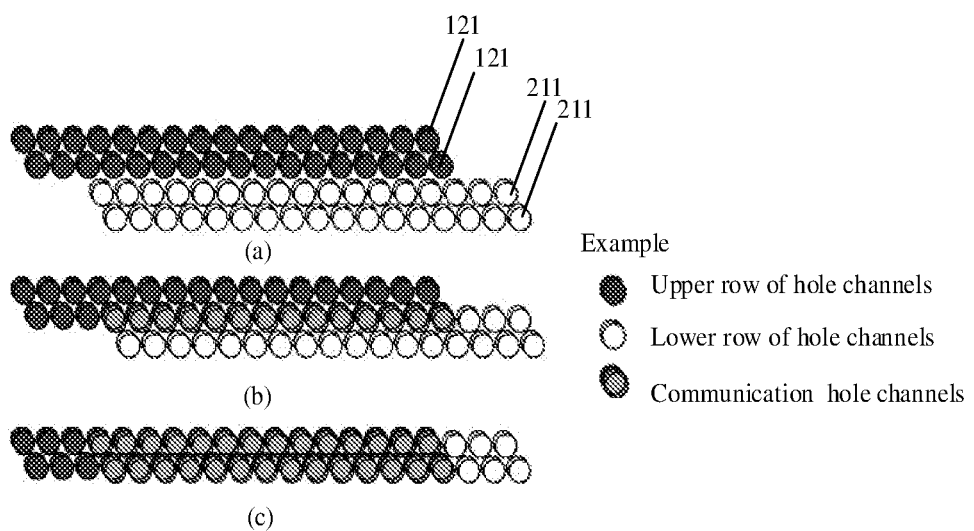

In the present application, an arrangement of the hole channel arrays is not specifically limited. In addition to the rectangular arrangements shown in FIG. 12, the staggered arrangements shown in FIG. 13 may also be used. The arrangements of the hole channel arrays shown in FIG. 13 makes the hole channels be arranged more compact. Compared with the hole channel arrays shown in FIG. 12, a contour edge printed by utilizing the hole channel arrays shown in FIG. 13 is also different.

Channel depths of the upper and lower rows of hole channels are superimposed together, and thus a resistance of materials passing through the two rows of hole channels is relatively large. In this case, the 3D printing device needs to provide relatively high pressure to extrude the materials from the two rows of hole channels. This problem is particularly prominent in a case of high-precision printing. This is because, in the case of high-precision printing, diameters of the hole channels in the two rows of hole channels may be very small, for example, may be 0.1 mm or less. In a printing process, a resistance of materials passing through the two rows of hole channels having very small diameters at a high speed may be very large, and a very high extrusion pressure is required to extrude the materials from the hole channels at a required speed. The high requirement of the two rows of hole channels for the extrusion pressure causes a relatively large size and high energy consumption of a whole material extrusion mechanism, thereby increasing costs of the 3D printing device.

Figure 14:
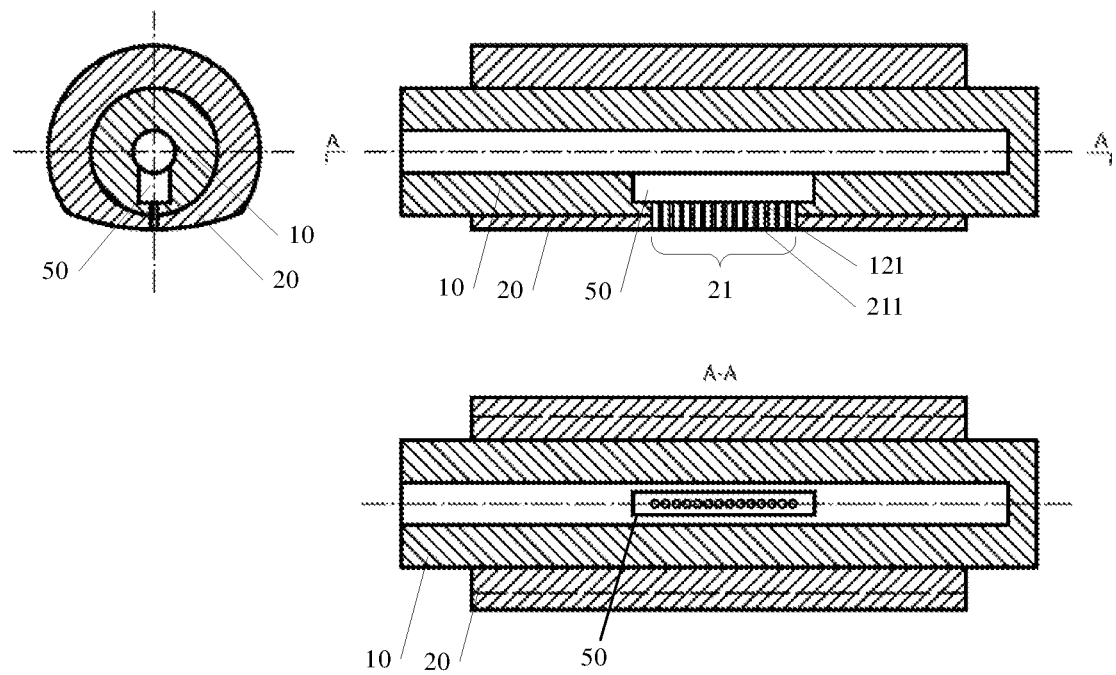
FIG. 14 shows schematic structural diagrams of another 3D printing device according to Embodiment 2 of the present application.

In order to resolve the foregoing problems, as shown in FIG. 14, in some embodiments, a groove 50 may be disposed in an inner wall of the feeding portion 10 (a shape of the groove 50 is not limited to the rectangle groove shown in FIG. 6, for example, may be designed as a circular arc). In this way, the channel depth is reduced by a depth of a groove. Since the resistance of the materials passing through the hole channels is proportional to the depths of the hole channels, a resistance of extruding materials by the 3D printing device may be reduced according to this embodiment.

In addition, in some other implementations, the channel depth may be reduced by thinning a cylinder wall where the sleeve is located. For example, as shown in the leftmost figure of FIG. 14, a part of the cylinder wall near the lower row of hole channels may be cut off in a specific arc shape.

If it is desired to apply the 3D printing device to the surface building scene described in PCT/CN2017/083647 or PCT/CN2018/113069, in a printing process, the control portion 30 may control a length of the extrusion port 21 to change with a contour line of a region to be filled, so as to complete filling of the region at one time.

Figure 15:
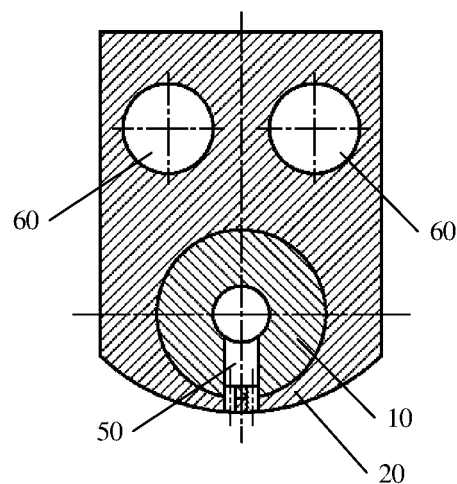
FIG. 15 is a schematic structural diagram of a sleeve with a thick and large structure according to Embodiment 2 of the present application.

In Embodiment 1 or Embodiment 2, the sleeve 20 may be in a shape of a cylinder or another shape. For example, as shown in FIG. 15, an upper part of the sleeve 20 may be designed as a thick and large structure, so that a heater 60 may be conveniently mounted therein.

In both Embodiment 1 and Embodiment 2, opening/closing control is performed for the plurality of hole channels by a way that controlling the feeding portion and the discharging portion move relative to each other, but the present application is not limited thereto. In some embodiments, opening/closing control may be performed directly and individually for each hole channel, without a need to provide two portions (namely, the feeding portion and the discharging portion mentioned above) that move relative to each other. For example, a separate switch may be provided for each hole channel, so as to individually control opening and closing of each hole channel.

Embodiment 3

Embodiment 3 shows method embodiments, and the description of the method embodiments corresponds to the description of the device embodiments. Therefore, for the part not described in detail herein, reference may be made to those in the device embodiments described above.

Figure 16:
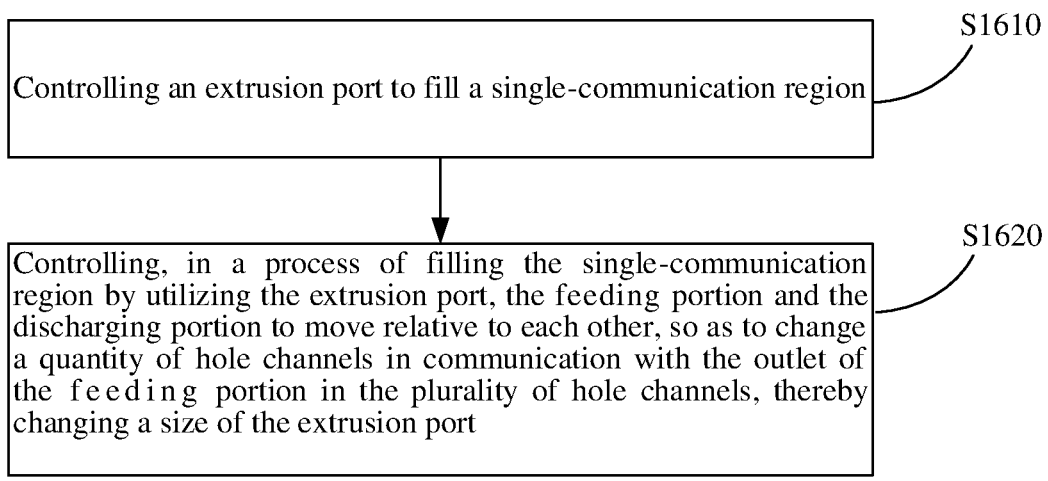
FIG. 16 is a schematic flowchart of a control method for a 3D printing device according to Embodiment 3 of the present application.

FIG. 16 is a schematic flowchart of a control method for a 3D printing device with an extrusion port having a variable size according to Embodiment 3 of the present application. The 3D printing device may include: a feeding portion having an inlet and an outlet for a material; and a discharging portion having an extrusion port, where the extrusion port is capable of being in fluid communication with the outlet of the feeding portion, so as to extrude the material, and the extrusion port is partitioned into a plurality of hole channels.

The control method shown in FIG. 16 may include steps S1610 and S1620 as follows.

In step S1610: controlling an extrusion port to fill a single-communication region.

In step S1620: controlling, in a process of filling the single-communication region by utilizing the extrusion port, the feeding portion and the discharging portion to move relative to each other, so as to change a quantity of hole channels in communication with the outlet of the feeding portion in the plurality of hole channels, thereby changing a size of the extrusion port.

Optionally, the feeding portion is an inner cylinder, and the discharging portion is a sleeve of the inner cylinder; and step S1620 may include: controlling the inner cylinder and the sleeve to move along an axial direction of the inner cylinder, so as to change the length of the extrusion port.

Optionally, the feeding portion is an inner cylinder, and the feeding portion is a sleeve of the inner cylinder; and the plurality of hole channels include a plurality of rows of hole channels. Step S1620 may include: controlling the inner cylinder and the sleeve to rotate around an axis of the inner cylinder, so as to change a quantity of rows of hole channels in a communication state in the plurality of rows of hole channels, thereby changing a width of the extrusion port.

Optionally, the discharging portion is a shielding plate located at an outer side of the outlet of the feeding portion. Step S1620 may include: controlling the feeding portion and the shielding plate to move relative to each other along one or more of a length direction and a width direction of the extrusion port.

Optionally, the method shown in FIG. 16 may further include: making the plurality of hole channels move out of a region where the outlet of the feeding portion is located, so as to simultaneously close the plurality of hole channels.

Optionally, materials extruded from the plurality of hole channels are capable of being fused together in the single-communication region.

Optionally, step S1610 may include: controlling a length of the extrusion port, to make the length of the extrusion port change with a contour line of the region, so as to fill the region completely at one time.

Optionally, the plurality of hole channels form a lower row of hole channels, and an upper row of hole channels opposite the lower row of hole channels is disposed in the outlet of the feeding portion.

Optionally, an inner part of the feeding portion is provided with a groove, and the upper row of hole channels is in fluid communication with the inlet through the groove.

Figure 17:
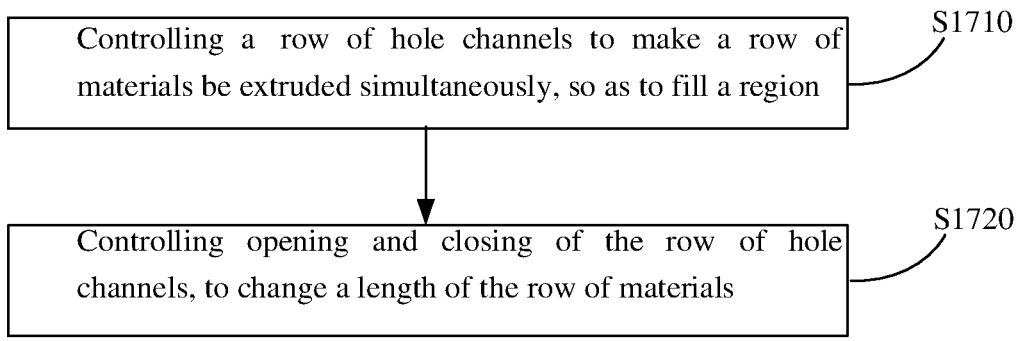
FIG. 17 is a schematic flowchart of a control method for another 3D printing device according to Embodiment 3 of the present application.

FIG. 17 is a schematic flowchart of a control method for another 3D printing device according to Embodiment 3 of the present application. The 3D printing device may include a row of hole channels, where an arrangement of the row of hole channels makes materials extruded from adjacent hole channels in the row of hole channels be capable of mutually fused in a region.

The control method shown in FIG. 17 may include steps S1710 and S1720 as follows.

In step S1710: controlling the row of hole channels to make a row of materials be extruded simultaneously, so as to fill a region; and In step S1720, controlling opening and closing of the row of hole channels, to change a length of the row of materials.

What is claimed is:

1. A three-dimensional (3D) printing device with an extrusion port having a variable size, comprising:
   a feeding portion having an inlet and an outlet for a material;
   a discharging portion having an extrusion port, wherein the extrusion port is capable of being in fluid communication with the outlet of the feeding portion, so as to extrude the material, and the extrusion port is partitioned into a plurality of hole channels; and
   a control portion, configured to control, in a process of filling a single-communication region by utilizing the extrusion port, the feeding portion and the discharging portion to move relative to each other, so as to change a quantity of hole channels in communication with the outlet of the feeding portion in the plurality of hole channels, thereby changing a size of the extrusion port,
   wherein the feeding portion is an inner cylinder, and the discharging portion is a sleeve of the inner cylinder; and the control portion is configured to control the inner cylinder and the sleeve to move along an axial direction of the inner cylinder, so as to change a length of the extrusion port.

2. The 3D printing device according to claim 1, wherein the plurality of hole channels comprise a plurality of rows of hole channels; and the control portion is configured to control the inner cylinder and the sleeve to rotate around an axis of the inner cylinder, so as to change a quantity of rows of hole channels in a communication state in the plurality of rows of hole channels, thereby changing a width of the extrusion port.

3. The 3D printing device according to claim 1, wherein the control portion is further configured to make the plurality of hole channels move out of a region where the outlet of the feeding portion is located, so as to simultaneously close the plurality of hole channels.

4. The 3D printing device according to claim 1, wherein materials extruded from the plurality of hole channels are capable of being fused together in the single-communication region.

5. The 3D printing device according to claim 1, wherein the control portion is configured to control the length of the extrusion port, to make the length of the extrusion port change with a contour line of a region to be filled, so as to fill the region completely at one time.

6. The 3D printing device according to claim 1, wherein the plurality of hole channels form a lower row of hole channels, and an upper row of hole channels opposite the lower row of hole channels is disposed in the outlet of the feeding portion.

7. The 3D printing device according to claim 6, wherein an inner part of the feeding portion is provided with a groove, and the upper row of hole channels is in fluid communication with the inlet through the groove.

8. A 3D printing device, comprising:
a row of hole channels, wherein all adjacent hole channels among the row of channels are separated from each other; and
a control portion, configured to control the row of hole channels to make a row of materials be extruded simultaneously, so as to fill a region, and control opening and closing of the row of hole channels, to change a length of the row of materials,
wherein an arrangement of the row of hole channels makes materials extruded from the adjacent hole channels in the row of hole channels be capable of mutually fused in the region.

9. The 3D printing device according to claim 8, wherein the row of hole channels belongs to a first hole channel array; and
the 3D printing device further comprises:
a second hole channel array, wherein an arrangement of the second hole channel array makes materials extruded from different hole channels in the second hole channel array separated from each other on a printing platform.

* * * * *